(12) United States Patent
Sharps et al.

(10) Patent No.: US 8,820,171 B2
(45) Date of Patent: Sep. 2, 2014

(54) METHOD TO MONITOR SAFE OPERATION OF AN ULTRACAPACITOR

(75) Inventors: Robert Wendell Sharps, Corning, NY (US); Todd Marshall Wetherill, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 393 days.

(21) Appl. No.: 13/237,139

(22) Filed: Sep. 20, 2011

(65) Prior Publication Data

US 2013/0069603 A1    Mar. 21, 2013

(51) Int. Cl.
  *G01L 9/12* (2006.01)
  *H01G 11/78* (2013.01)
  *H01G 9/12* (2006.01)
  *H01G 2/14* (2006.01)

(52) U.S. Cl.
  CPC ... *H01G 11/78* (2013.01); *G01L 9/12* (2013.01); *H01G 9/12* (2013.01); *H01G 2/14* (2013.01); *Y02E 60/13* (2013.01)
  USPC .......................................... 73/718; 361/502

(58) Field of Classification Search
  CPC ....... Y02E 60/13; Y02E 60/12; Y02E 60/122; Y02E 60/50; H01G 9/038; H01G 9/155; H01G 9/08; H01G 11/28; H01G 11/30; H01G 11/32; H01G 11/34; H01G 11/58; H01G 11/62; H01G 4/32; H01G 4/38; H01G 9/02; H01G 9/12
  USPC .................................................. 73/700–756
  See application file for complete search history.

(56) References Cited

U.S. PATENT DOCUMENTS

| | | | | |
|---|---|---|---|---|
| 5,461,922 A * | 10/1995 | Koen | ............................... | 73/756 |
| 5,786,980 A * | 7/1998 | Evans | ........................... | 361/502 |
| 7,383,737 B1 * | 6/2008 | Lin et al. | ......................... | 73/718 |
| 7,983,021 B2 * | 7/2011 | Reddy et al. | .................. | 361/502 |
| 2002/0051912 A1 * | 5/2002 | Fitter et al. | ..................... | 429/347 |
| 2004/0048144 A1 * | 3/2004 | Fitter et al. | ..................... | 429/61 |
| 2004/0149042 A1 * | 8/2004 | Gerst et al. | ..................... | 73/723 |
| 2009/0109600 A1 * | 4/2009 | Reddy et al. | .................. | 361/502 |

FOREIGN PATENT DOCUMENTS

| DE | 10200407762 A1 | 4/2006 |
|---|---|---|
| DE | 102005018339 | 10/2006 |
| JP | 4012517 | 1/1992 |

(Continued)

OTHER PUBLICATIONS

Ashtiani, et al., "Ultracapacitors for Automotive Applications", Journal of Power Sources, 154 (2006), pp. 561-566.

(Continued)

*Primary Examiner* — Andre Allen
(74) *Attorney, Agent, or Firm* — Michael W. Russell (57) ABSTRACT

A container of an electrochemical double-layer capacitor for holding electrodes and electrolyte includes a housing having a cavity and a cap portion coupled to the housing forming a fluid-tight reservoir with the cavity. The container also includes a plurality of terminals incorporated into one or more of the housing or the cap portion, where the plurality of terminals adapted to be electrically coupled to the electrodes, and a pressure-compliant membrane incorporated into one of the housing or the cap portion. A pressure monitoring system that monitors the pressure inside the container includes a displacement measuring device adapted to measure a deflection of the pressure-compliant membrane.

6 Claims, 5 Drawing Sheets

(56) References Cited

FOREIGN PATENT DOCUMENTS

| JP | 5251290 | 9/1993 |
|---|---|---|
| JP | 10174278 | 6/1998 |
| JP | 2001068387 | 3/2001 |
| JP | 2001/1230161 A | 8/2001 |
| JP | 2002/289172 A | 10/2002 |
| JP | 2004/193251 A | 7/2004 |
| JP | 2010/034244 A | 2/2010 |
| JP | 2010/056501 A | 3/2010 |

OTHER PUBLICATIONS

Aurbach, et al., "Cation Trapping in Highly Porous Carbon Electrodes for EDLC Cells", Journal of the Electrochemical Society, 155 (1), A745-A753, (2008).

Hahn, et al., "Pressure Evolution in Propylene Carbonate Based Electrochemical Double Layer Capacitors", Electrochimica Acta, 52, (2006), pp. 1709-1712.

Kotz, et al., "Aging and Failure Mode of Electrochemical Double Layer Capacitors During Accelerated Constant Load Tests", Journal of Power Sources; 195; (2010), pp. 923-928.

Kurzweil, et al., "Electrochemical Stability of Organic Electrolytes in Supercapacitors: Spectroscopy and Gas Analysis of Decomposition Products", Journal of Power Sources; 176, (2008), pp. 555-567.

R. Roark, Formulas for Stress and Strain, 4th Ed., McGraw-Hill, 1965, pp. 244-245.

PCT/US2012/055051 Search Report.

Machine translation of DE102005018339.

Machine translation of JP2001068387.

Machine translation of JP5251290.

Machine translation of JP10174278.

Machine translation of JP4012517.

\* cited by examiner

FIG. 7

METHOD TO MONITOR SAFE OPERATION OF AN ULTRACAPACITOR

BACKGROUND

The present disclosure is generally directed to pressure monitoring systems for electrochemical double-layer capacitors.

SUMMARY

Electric double-layered capacitors, or ultracapacitors, are electrochemical energy storage devices that typically exhibit higher energy density than other electrochemical capacitor types. However, when the electrochemical double-layer capacitor is charged at its rated voltage over time, gases can be generated inside the container in which the capacitor is held. This generation of gases is a byproduct of undesired chemical and electrochemical reactions that may occur when storing and discharging the electrochemical double-layer capacitor. The generation of gases may tend to increase the internal pressure of the container.

Venting of built up gases from the electrochemical double-layer capacitor may be undesired. For instance, the gases may be harmful to humans or the environment, and may be prone to fire or explosion. Further, venting may allow external air and water vapor to be introduced into the container, which may further degrade the performance of the electrochemical double-layer capacitor.

The inventors have recognized that electrochemical double-layer capacitors tend to increase the production of gases during charging as the performance of the electrochemical double-layer capacitor itself degrades. As the performance of the electrochemical double-layer capacitor degrades, more gaseous products may be created, thereby further increasing the pressure inside the container. Accordingly, the inventors have identified that the internal pressure of the container may be correlated to health and/or performance of the electrochemical double-layer capacitor.

In order to monitor the health of the electrochemical double-layer capacitor and to prevent the electrochemical double-layer capacitor from experiencing an over-pressure condition, the inventors have developed an external pressure monitoring system that can monitor the internal pressure of the container.

In one embodiment, a container of an electrochemical double-layer capacitor for holding electrodes and electrolyte includes a housing having a cavity and a cap portion coupled to the housing forming a fluid-tight reservoir with the cavity. The container also includes a plurality of terminals incorporated into one or more of the housing or the cap portion, where the plurality of terminals are adapted to be electrically coupled to the electrodes, and a pressure-compliant membrane is incorporated into one of the housing or the cap portion.

In another embodiment, a pressure monitoring system for an electrochemical double-layer capacitor includes a container having a fluid-tight reservoir, a pressure-compliant membrane incorporated into the container, where the pressure-compliant membrane deflects in response to a fluidic pressure inside the fluid-tight reservoir. The pressure monitoring system also includes a displacement measuring device adapted to measure a deflection of the pressure-compliant membrane.

In yet another embodiment, a method of managing pressure inside a container includes monitoring the deflection of a pressure-compliant membrane in fluid communication with a fluid-tight reservoir in the container holding an electrochemical double-layer capacitor. The method also includes comparing the deflection of the pressure-compliant membrane with a datum portion of the container.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein relate to pressure monitoring systems for electrochemical double-layer capacitors. An example pressure monitoring system includes a container inside of which an electrochemical double-layer capacitor is disposed, and a pressure-compliant membrane incorporated into the container and in fluid communication with the electrochemical double-layer capacitor. The pressure monitoring system also includes a displacement measuring device. As the pressure inside the container increases, the pressure-compliant membrane deflects outwards. The displacement measuring device monitors the outwards deflection of the pressure-compliant membrane. The deflection can be processed to estimate the pressure inside the container.

Figure 1:
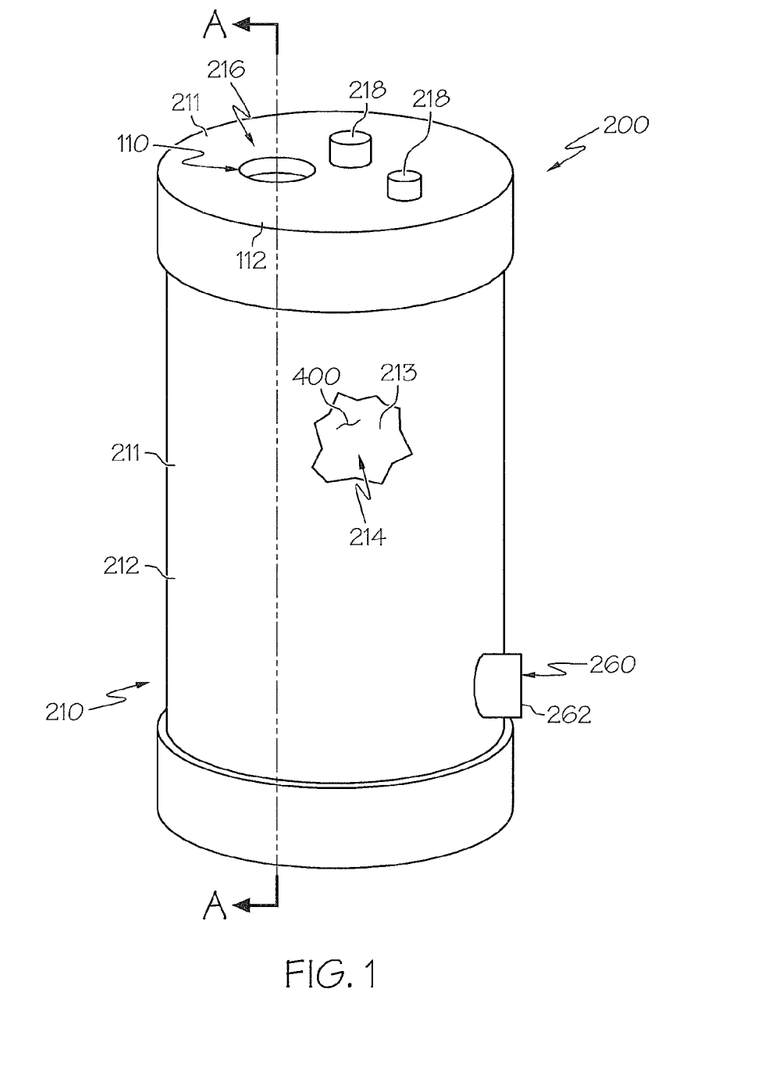
FIG. 1 depicts a front perspective view of a container for an electrochemical double-layer capacitor according to one or more embodiments shown and described herein.

Referring to FIG. 1, an electrochemical double-layer capacitor 200 includes a container 210 having a fluid-tight reservoir 214. In the depicted embodiment, the container 210 includes a housing 212 having a cavity 213 and a cap portion 216 coupled to the housing 212 or is integral to the housing 212. The housing 212 and the cap portion 216 together create a fluid-tight reservoir 214 into which a double-layer capacitor cell 400 is inserted. The double-layer capacitor cell 400 is surrounded by a liquid electrolyte that fills any voids in the fluid-tight reservoir 214.

A pressure-compliant membrane 110 is incorporated into an externally-accessible surface 211 of the container 210. In the depicted embodiment, the pressure-compliant membrane 110 is incorporated into the cap portion 216; however, the pressure-compliant membrane 110 may be incorporated into an externally-accessible surface 211 of the housing 212.

Figure 2:
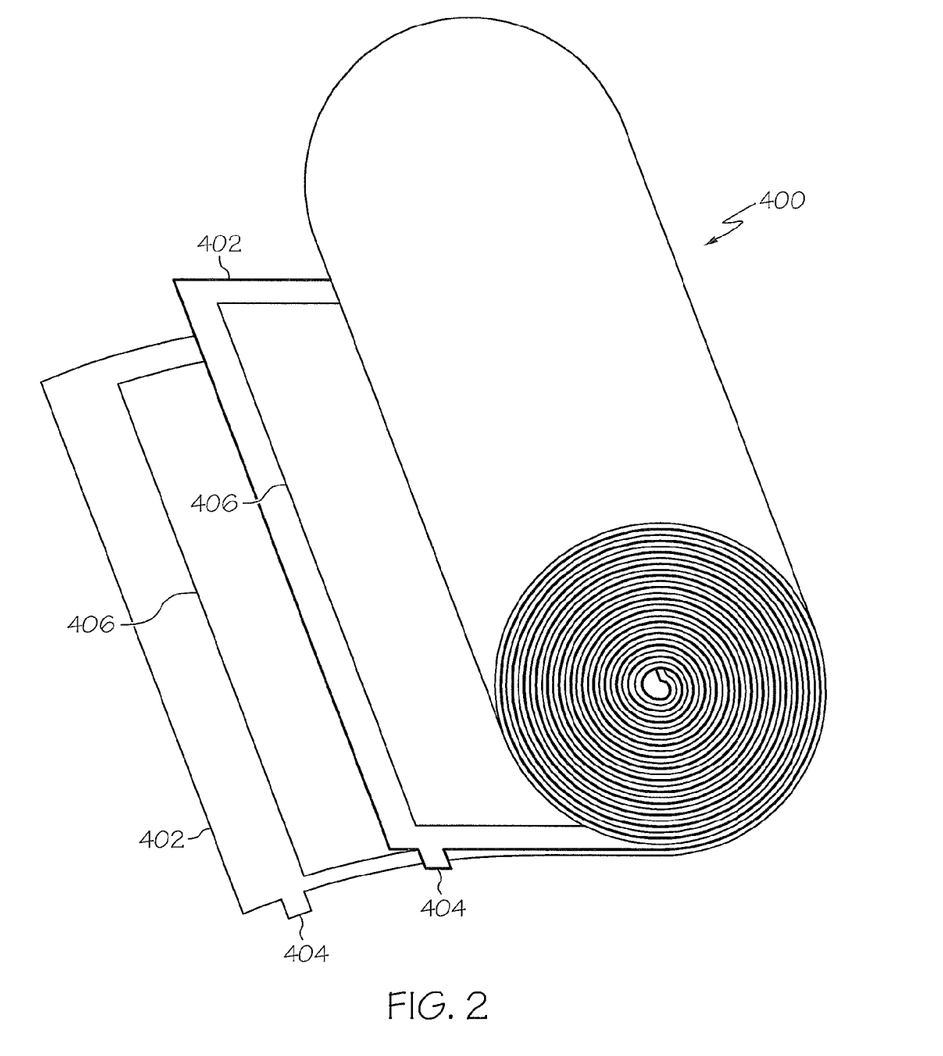
FIG. 2 depicts a front perspective view of a partially unwound electrochemical double-layer capacitor according to one or more embodiments shown and described herein.

Referring to FIG. 2, an electrochemical double-layer capacitor 200 includes a double-layer capacitor cell 400 that includes two electrodes 402 separated by a non-conductive separator layer 406 that physically separates the electrodes 402 and prevents the electrodes 402 from shorting one another. The non-conductive separator layers 406 may be formed from a porous dielectric material including, but not limited to, paper. The double-layer capacitor cell 400 may be a "jelly roll" style, where the electrodes 402 and the non-conductive separator layers 406 are wrapped about one another into a generally cylindrical shape. Electrolyte is dispersed throughout the layers of the cell 400. When a voltage is applied across each of the two electrodes 402, the electrolyte can ionize and an electric field on the surface of each electrode 402 can accumulate a charge. The electrochemical double-layer capacitor 200 can store this charge until it is needed, at which time the charge the electrodes 402 can be discharged.

The electrodes 402 according to the present disclosure may include any conductive material suitable for use in an electrochemical double-layer capacitor 200. In one embodiment, at least one of the electrodes 402 comprises a flexible conductive material that can be, for example, folded, rolled, or coiled. In another embodiment, at least one of the electrodes 402 comprises a metal, including, for example, aluminum. In another aspect, one or both of the electrodes 402 comprise a carbon material, including, for example, a carbon coating, that increases the surface area of an electrode 402. It is not required that both electrodes 402 have the same composition and both aspects where the electrodes 402 have the same and different compositions are contemplated. In another embodiment, the electrodes 402 comprise a material compatible with the other materials and electrolytes utilized in the electrochemical double-layer capacitor 200 design.

The electrodes 402 include a material that is substantially non-corrosive in the electrochemical double-layer capacitor 200 environment. In some embodiments, at least one of the electrodes 402 comprises a coating on at least one surface thereof, including, for example, all or a portion of the bulk of the electrode 402. In these embodiments, carbon coating comprising, for example, a high surface area carbon, is present on at least a portion of one surface of at least one of the electrodes 402. In a further aspect, all of the active areas of an electrode 402 surface comprise a high surface area carbon coating. Electrode 402 and electrode coating materials are commercially available and one of skill in the art may select appropriate electrode 402 and/or electrode coating materials.

The non-conductive separator layer 406 may include, for example, a paper, mica, glass, ceramic, aerogel, silica, non-conductive carbon, polymeric material, or a combination thereof. The non-conductive material is substantially non-conductive under the voltages and operating conditions of operation for a given electrochemical double-layer capacitor 200. The non-conductive separator layer 406 may be porous as to allow an electrolyte to permeate and/or diffuse through the non-conductive separator layer 406.

In the embodiment depicted in FIG. 2, the electrodes 402 include connection regions 404 that extend from the bulk of the electrodes 402. The connection regions 404 of the electrodes 402 are electrically coupled to terminals 218 incorporated into one or more of the housing 212 or the cap portion 216, as illustrated in FIG. 1.

Referring again to FIG. 1, with the electrodes 402 wound into the generally cylindrical shape, the double-layer capacitor cell 400 is introduced to the cavity 213 of the housing 212. Liquid electrolyte is introduced to the cavity 213 such that the electrolyte surrounds electrodes 402. The cap portion 216 is coupled to and secured to the housing 212, forming a fluid-tight reservoir 214 with the housing 212 that keeps the liquid electrolyte within the housing 212, and therefore the container 210.

The container 210 may further include a pressure relief valve 260 incorporated into one of the housing 212 or the cap portion 216. The pressure relief valve 260 allows gas and/or liquid electrolyte to escape the fluid-tight reservoir 214 before an over-pressure event occurs. As used herein, an "over-pressure event" refers to a compromise of the sealed integrity of the fluid-tight reservoir 214 that results due to an elevated pressure. The pressure relief valve 260 limits the maximum amount of pressure that can build in the fluid-tight reservoir 214. The pressure relief valve 260 may take the form of a rupture disk 262 that bursts in the event the pressure inside the fluid-tight reservoir 214 approaches a pressure likely to cause an over-pressure event. Alternatively, or in addition, pressure relief valve 260 may take the form of a one-way valve that allows gas and liquid at elevated pressure inside the reservoir 214 to exit into the environment without allowing ambient air and/or liquid into the reservoir 214. In addition, the pressure relief valve 260 controls the location where gas and/or liquid electrolyte escapes from the reservoir 214. Therefore, the structure surrounding the container 210 may be designed to accommodate fluid flow from the pressure relief valve 260.

Multiple electrochemical double-layer capacitors 200 may be electrically coupled together to provide the required electrical storage for a given application. A container 210 may include a plurality of fluid-tight reservoirs 214 into each of which a double-layer capacitor cell 400 is inserted.

Figure 3:
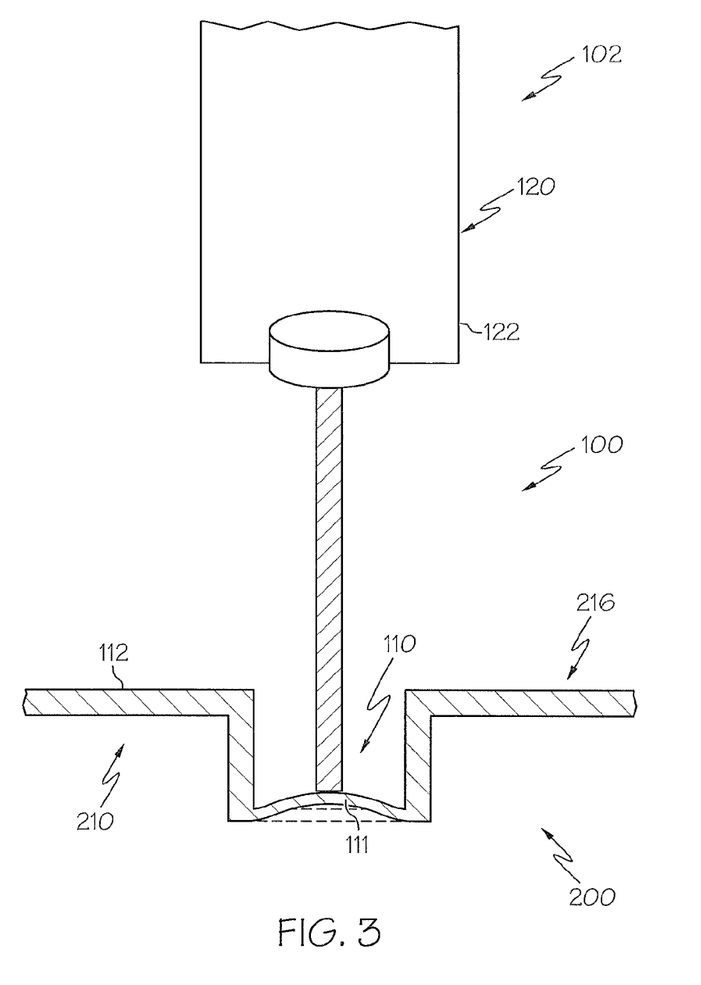
FIG. 3 depicts a partial front sectional view of the container for an electrochemical double-layer capacitor of FIG. 1 along line A-A including a displacement measuring device according to one or more embodiments shown and described herein.

Referring now to FIG. 3, one embodiment of a pressure monitoring system 100 for an electrochemical double-layer capacitor 200 is depicted. The pressure monitoring system 100 includes a displacement measuring device 102 that monitors the deflection of the pressure-compliant membrane 110. The embodiment depicted in FIG. 3 includes an optical measurement system 120 that monitors a displacement distance of the pressure-compliant membrane 110. Optical measurement systems 120 may include, but are not limited to, lasers 122, high-resolution cameras, and white light scanning sensors.

The pressure-compliant membrane 110 depicted in FIG. 3 is a locally thinned portion 111 of the container 210. As the pressure of the liquid electrolyte within the container 210 increases, the pressure-compliant membrane 110 will deflect outwards. The displacement measuring device 102 monitors the minimum distance between the displacement measuring device 102 and the pressure-compliant membrane 110. The displacement measuring device 102 may also monitor the distance between the displacement measuring device 102 and a datum surface 112, here an adjacent surface of the cap portion 216. Monitoring the distance between the pressure-compliant membrane 110 and the datum surface 112 allows for determination of the deflection distance of the pressure-compliant membrane 110. This deflection distance corresponds to the internal pressure within the container 210.

While the embodiment illustrated in FIG. 3 shows the pressure-compliant membrane 110 recessed from the datum surface 112, other embodiments of the container 210 where the pressure-compliant membrane 110 is positioned along the datum surface 112 are envisioned. In such an embodiment, the pressure-compliant membrane 110 is approximately planar with the datum surface 112 when a pressure inside the container 210 does not deform the pressure-compliant membrane 110 outward.

Without being bound by theory, the deflection distance of the pressure-compliant membrane 110 is based on a variety of factors including, but not limited to, thickness and material properties of the pressure-compliant membrane 110, the connection method between the pressure-compliant membrane 110 and the surrounding structure of the container 210, and the intensity of the internal pressure within the container 210 that causes a pressure differential to be applied across the pressure-compliant membrane 110. An electrochemical double-layer capacitor 200 according to the present disclosure may be designed such that the pressure differential across the pressure-compliant membrane 110 is detected by the displacement measuring device 102 before stress in the pressure-compliant membrane 110 due to the pressure differential exceeds the yield strength and/or tensile strength of the pressure-compliant membrane 110. If the tensile strength of the pressure-compliant membrane 110 is exceeded, the pressure-compliant membrane may compromise the sealed integrity of the fluid-tight reservoir 214. Therefore, the pressure monitoring system 100 detects an increase in pressure inside the fluid-tight reservoir 214 before such an over-pressure event occurs.

The container 210 may be made from a variety of materials including, but not limited to, metals including aluminum, steel, and alloys thereof, plastics, fiber reinforced plastics, or ceramics. Similarly, the pressure-compliant membrane 110 may be made from a variety of suitable materials. In one embodiment, the pressure-compliant membrane 110 may be made from 1000-series aluminum.

Figure 4:
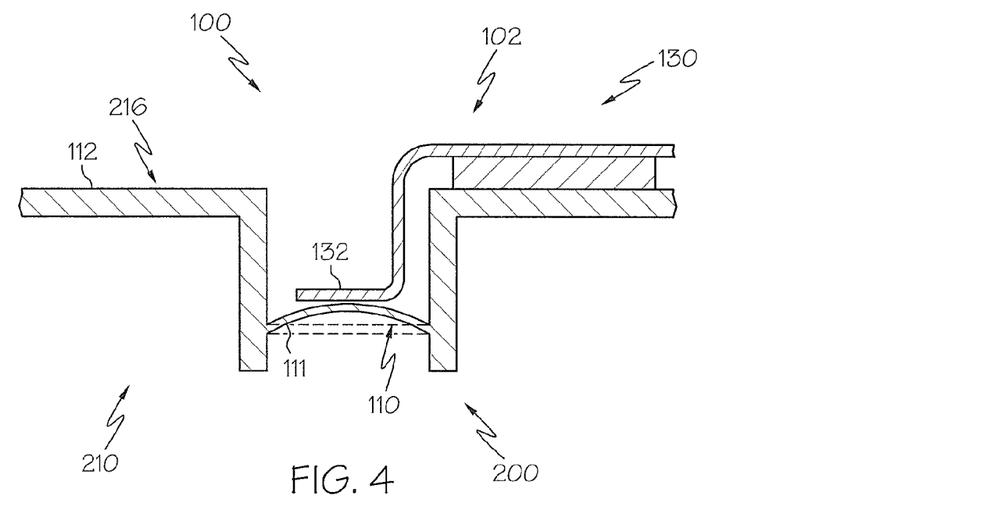
FIG. 4 depicts a partial front sectional view of the container for an electrochemical double-layer capacitor of FIG. 1 along line A-A including a displacement measuring device according to one or more embodiments shown and described herein.

Referring now to FIG. 4, another embodiment of a pressure monitoring system 100 for an electrochemical double-layer capacitor 200 is depicted. The pressure monitoring system 100 includes a displacement measuring device 102 that measures deflection of the pressure-compliant membrane 110 based on contact between the displacement measuring device 102 and the pressure-compliant membrane 110. The displacement measuring device 102 of FIG. 4 is a contact monitoring system 130 that registers contact between a contact sensing probe 132 and the pressure-compliant membrane 110. The contact monitoring system 130 may provide an electronic signal that indicates contact between the contact sensing probe 132 and the pressure-compliant membrane 110. The contact sensing probe 132 is spaced away from the undeformed pressure-compliant membrane 110 a distance that corresponds to a maximum desired internal pressure of the container 210.

In another embodiment of a pressure monitoring system 100, the contact monitoring system 130 may include a force measurement device coupled to the contact sensing probe 132. The contact sensing probe 132 may deflect the pressure-compliant membrane 110 back to the undeformed state. The force required to deform the pressure-compliant membrane 110 back to the undeformed state, as measured by the force measurement device, corresponds to the internal pressure of the container 210.

Figure 5:
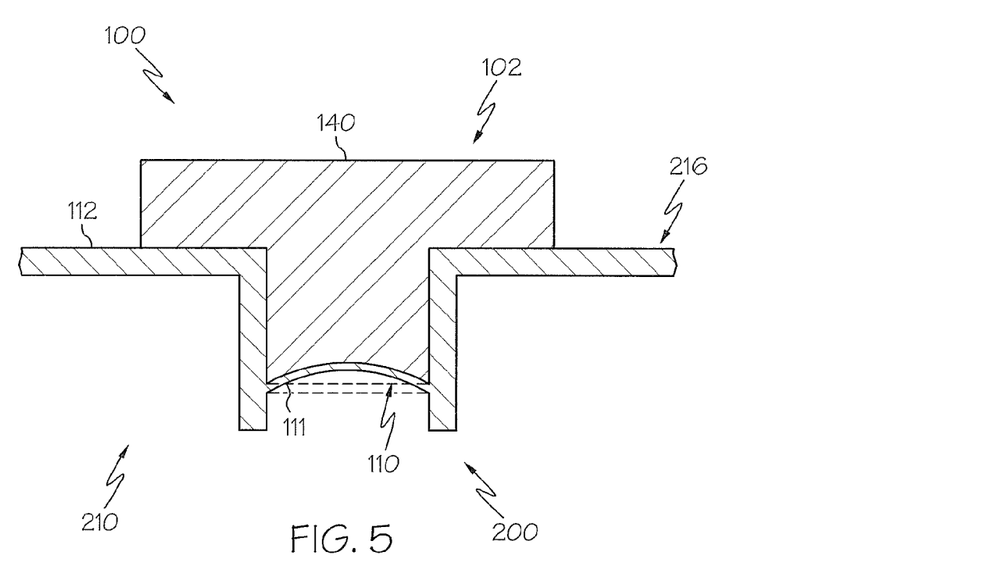
FIG. 5 depicts a partial front sectional view of the container for an electrochemical double-layer capacitor of FIG. 1 along line A-A including a displacement measuring device according to one or more embodiments shown and described herein.

Referring now to FIG. 5, another embodiment of a pressure monitoring system 100 for an electrochemical double-layer capacitor 200 is depicted. The pressure monitoring system 100 includes a castable medium 140 that is introduced to the container 210 as a liquid, a plastic solid, or a viscoelastic fluid and allowed to solidify or deform and take the shape of the pressure compliant membrane 110 and the datum surface 112. One example of such a castable medium 140 includes a putty. As depicted in FIG. 5, the castable medium 140 is placed on the cap portion 216 of the container 210 such that the castable medium 140 is in contact with both the pressure-compliant membrane 110 and the datum surface 112. Once the castable medium 140 is solidified, the deflection of the pressure-compliant membrane 110 is retained in the castable medium 140, which is removed from the container 210 and may be inspected according to a variety of inspection methods to determine the deflection of the pressure-compliant membrane 110.

Figure 6:
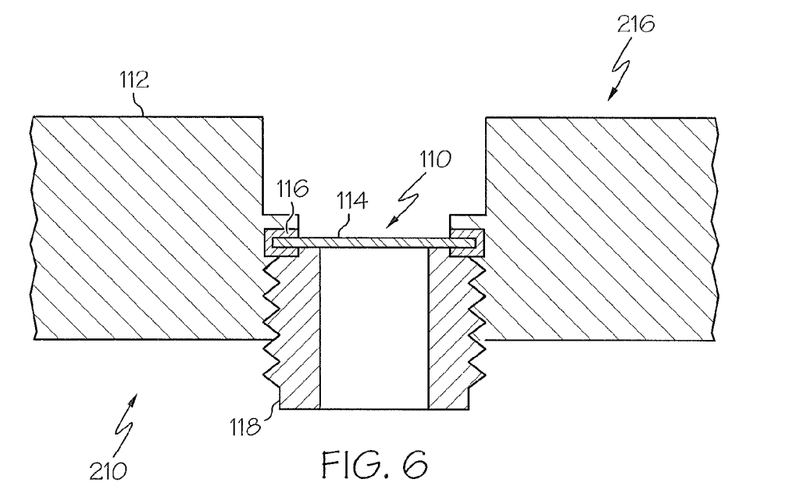
FIG. 6 depicts a partial front sectional view of the container for an electrochemical double-layer capacitor of FIG. 1 along line A-A including a pressure-sensitive membrane according to one or more embodiments shown and described herein.

Referring now to FIG. 6, another embodiment of the pressure-compliant membrane 110 is depicted. In this embodiment, the pressure-compliant membrane 110 includes an elastic barrier sheet 114 that is held captive within a retaining ring 116. The pressure-compliant membrane 110 is inserted into an opening in the container 210 such that the pressure-compliant membrane 110 is in fluid communication with the liquid electrolyte and any gases held in the fluid-tight reservoir 214. As depicted in FIG. 6, the retaining ring 116 is held in place by a set screw 118, which applies a sealing force to the retaining ring 116 to maintain the fluid-tight reservoir 214 and continues to allow the pressure-compliant membrane 110 to remain in fluid communication with the fluid-tight reservoir 214. As discussed in regard to the pressure monitoring systems 100 illustrated in FIGS. 3-5, the deflection of the pressure-compliant membrane 110 may be compared to a datum surface 112 of the container 210.

While the pressure-compliant membrane 110 illustrated in FIG. 6 is secured to the container 210 with a mechanical fastener, other securing methods, including, but not limited to, welding, brazing, and adhering, are contemplated. In one embodiment, the pressure-compliant membrane 110 is laser-welded to surrounding structure of the cap portion 216.

Figure 7:
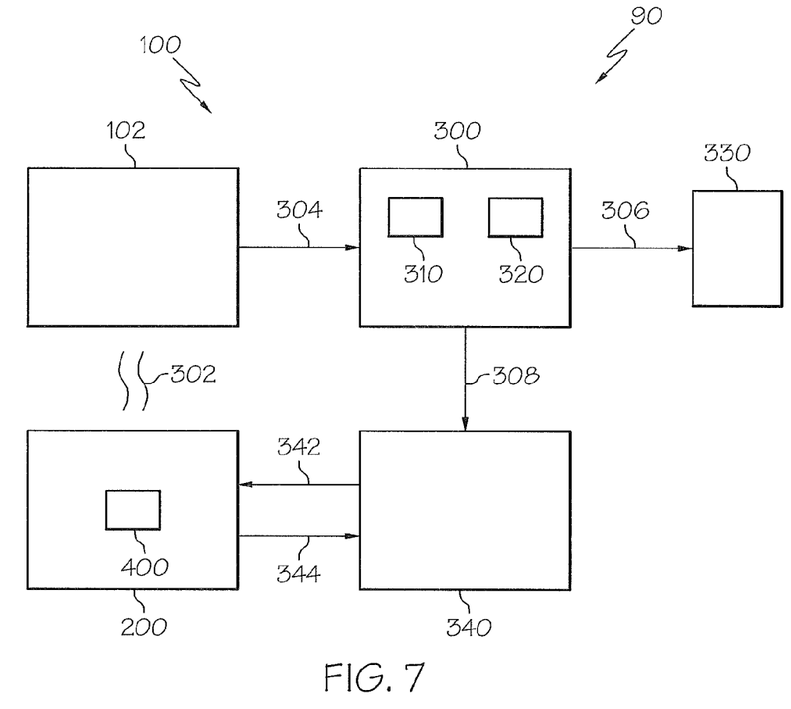
FIG. 7 depicts a schematic view of a pressure monitoring system for an electrochemical double-layer capacitor according to one or more embodiments shown and described herein.

Referring now to FIG. 7, a control system 90 for monitoring or controlling operation of an electrochemical double-layer capacitor 200 incorporates the pressure monitoring system 100. The displacement measuring device 102 determines the displacement of the pressure-compliant membrane 110 or determines if the pressure-compliant membrane 110 is contacting the contact sensing probe 132 at the displacement sensing signal 302. The displacement measuring device 102 sends a displacement distance signal 304 to an electronic control unit 300. The electronic control unit 300 includes a processor 310 and memory 320 that stores a computer readable and executable instruction set. When the electronic control unit 300 determines that a maximum internal pressure within the electrochemical double-layer capacitor 200 has been reached, the electronic control unit 300 may send an indication signal 306 to an indicator 330, which indicates to a user that a maximum internal pressure within the electrochemical double-layer capacitor 200 has been reached. Examples of such indicators 330 include, but are not limited to, signal lights or audible chimes.

The electronic control unit 300 may also send a charge control signal 308 to a charge management system 340. The charge management system 340 includes system architecture that applies an elevated voltage differential to the double-layer capacitor cell 400 of the electrochemical double-layer capacitor 200, which increases the stored charge, or applies a lowered voltage differential to the double-layer capacitor cell 400, which decreases the stored charge. Because a rising pressure within the container 210 is indicative of poor performance and/or decreasing health of the electrochemical double-layer capacitor 200, the charge control signal 308 may provide instructions to the charge management system 340 to stop providing charge voltage 342 to the double-layer capacitor cell 400 of the electrochemical double-layer capacitor 200. The charge control signal 308 may also provide instructions to the charge management system 340 to apply a discharge voltage 344 to the electrochemical double-layer capacitor 200. By discharging the electrochemical double-layer capacitor 200, pressure inside the container 210 may decrease and may reduce the likelihood of an over-pressure event within the container 210.

In some embodiments, the electronic control unit 300 may be electronically coupled to the pressure relief valve 260. The electronic control unit 300 may provide a valve positioning signal to the pressure relief valve 260 to move to an open position, such that gas and/or liquid electrolyte may exit the container 210, reducing the reduce the likelihood of an over-pressure event within the container 210.

It should now be understood that pressure monitoring systems for electrochemical double-layer capacitors according to the present disclosure monitor the deflection of a pressure-compliant membrane to determine pressure inside a fluid-tight reservoir holding a double-layer capacitor cell. The deflection of the pressure-compliant membrane is correlated to the internal pressure applied against the membrane, and is indicative of performance and health of the double-layer capacitor cell. The pressure monitoring system may be included with a control system that commands stopping of electrical charging of the electrochemical double-layer capacitor and/or commands discharging of voltage from the electrochemical double-layer capacitor.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of managing pressure inside an electrochemical double-layer capacitor container comprising:
    monitoring a deflection of a pressure-compliant membrane in fluid communication with a fluid-tight reservoir in the container of the electrochemical double-layer capacitor;
    comparing the deflection of the pressure-compliant membrane with a datum portion of the container.

2. The method of managing pressure of claim 1, wherein the deflection of the pressure-compliant membrane is measured by an optical measurement system.

3. The method of managing pressure of claim 1 further comprising:
    introducing a castable medium to the pressure-compliant membrane and the datum portion of the container; and
    solidifying the castable medium.

4. The method of managing pressure of claim 1, wherein the deflection of the pressure-compliant membrane is measured by a contact monitoring system that generates a displacement distance signal when the pressure-compliant membrane contacts a contact sensing probe.

5. The method of managing pressure of claim 1 further comprising issuing a signal to a charge management system to stop charge management the electrochemical double-layer capacitor.

6. The method of managing pressure of claim 1 further comprising issuing a signal to a charge management system to discharge the electrochemical double-layer capacitor.

* * * * *